Jan. 29, 1929.
G. G. ROBERTS
1,700,420
APPARATUS FOR DRAWING SHEET GLASS
Filed April 12, 1926    5 Sheets-Sheet 4
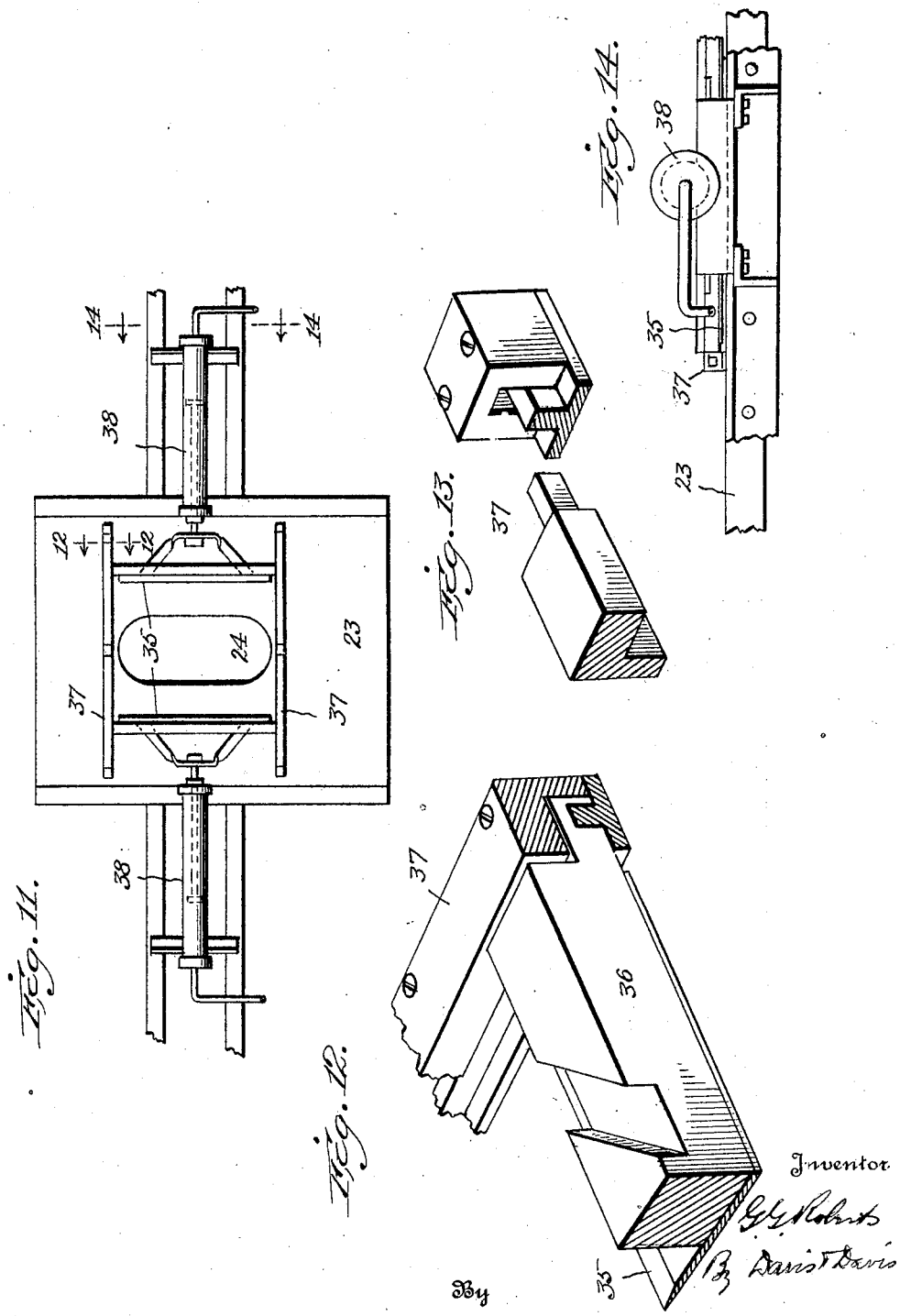

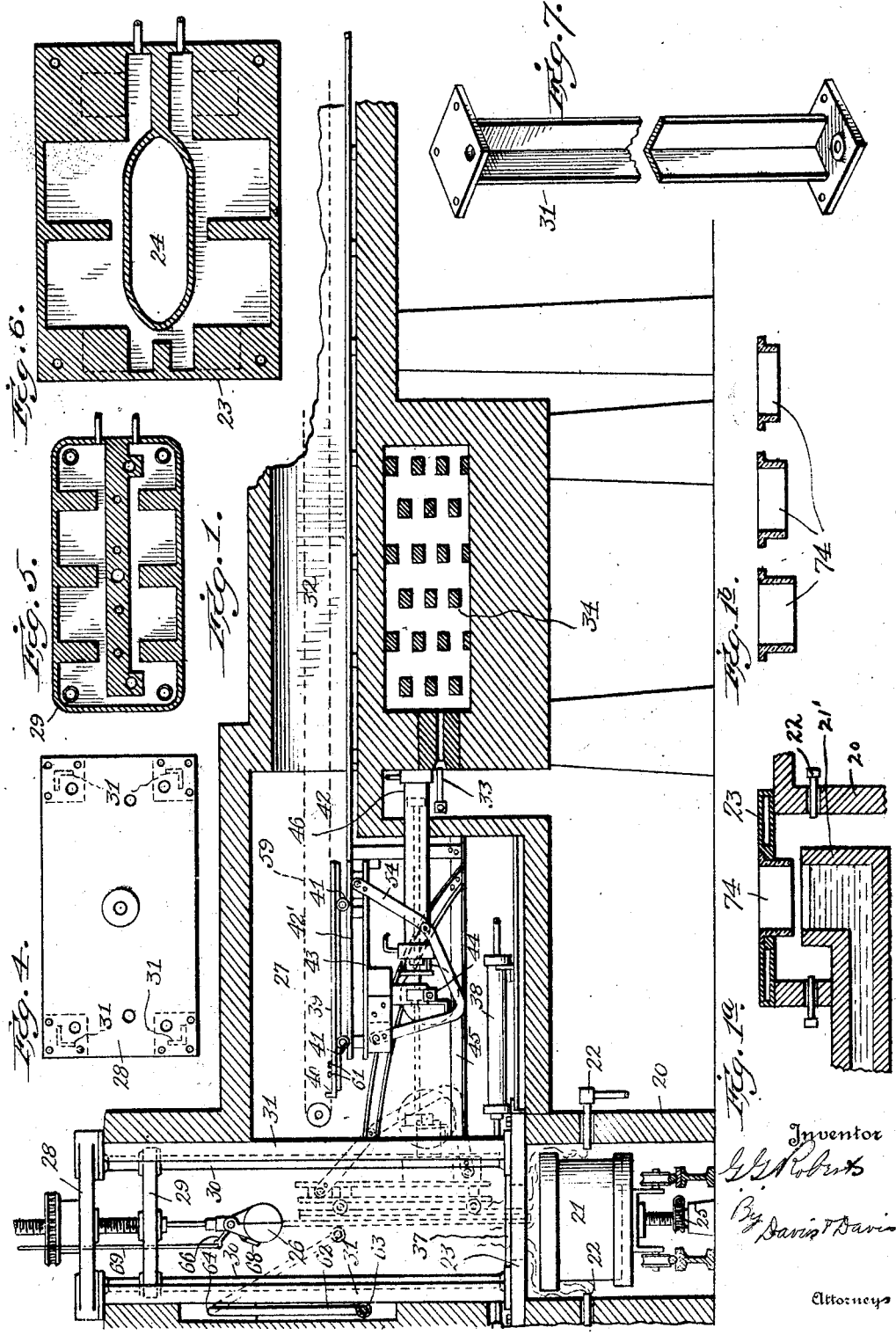

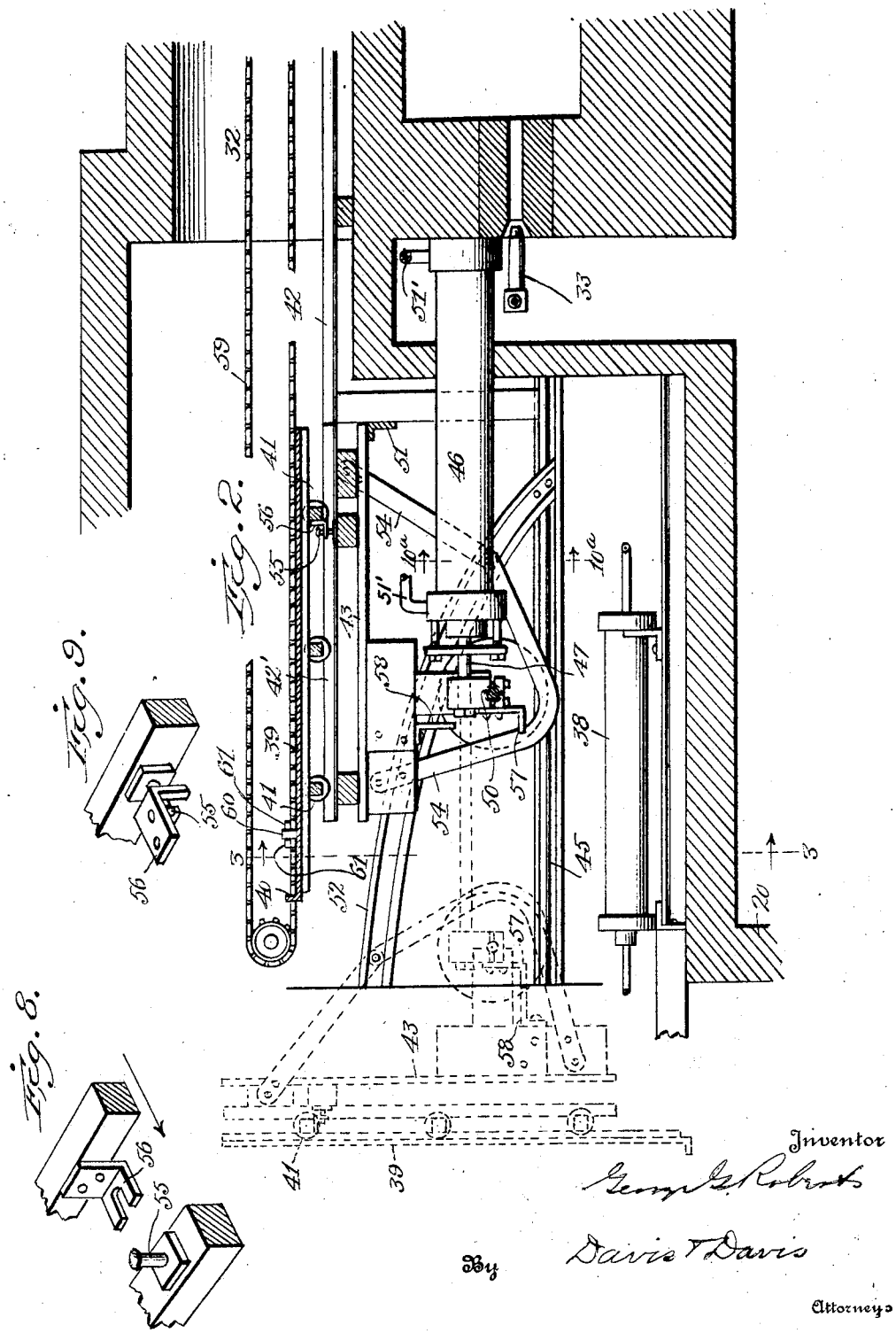

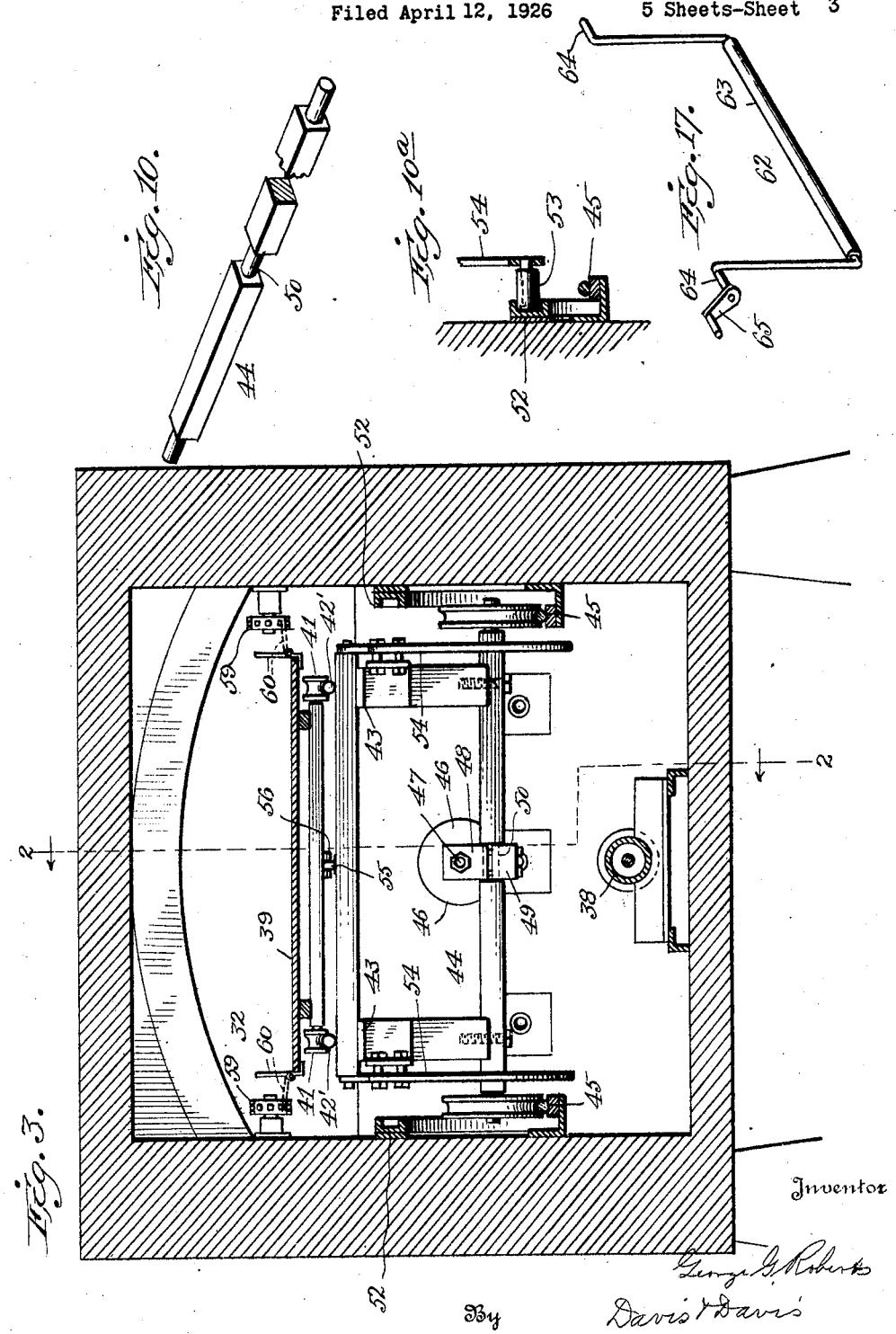

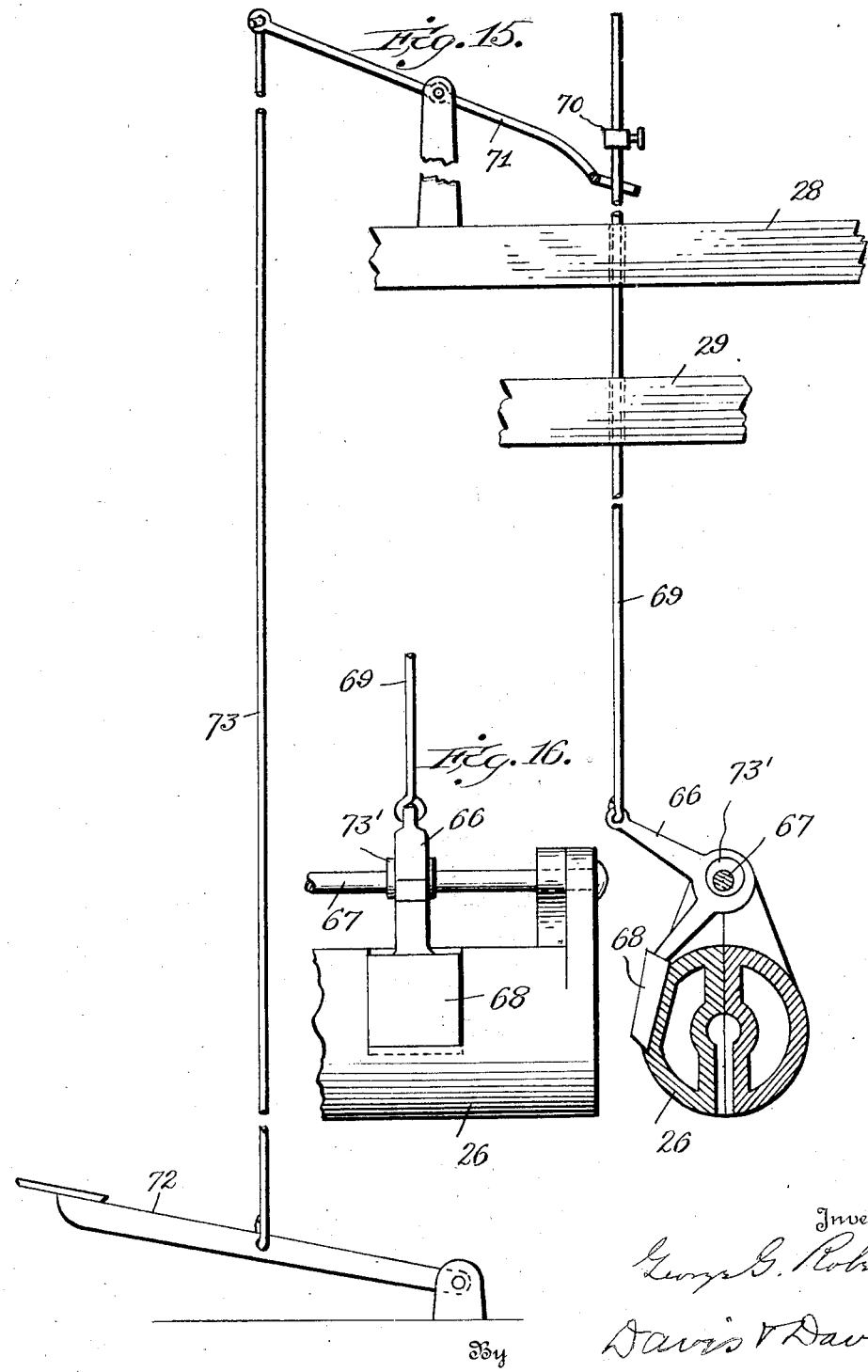

Patented Jan. 29, 1929.

1,700,420

UNITED STATES PATENT OFFICE.

GEORGE G. ROBERTS, OF BALLSTON, VIRGINIA, ASSIGNOR TO VIRGINIA PLATE GLASS CORPORATION, OF WASHINGTON, DISTRICT OF COLUMBIA, A CORPORATION OF VIRGINIA.

APPARATUS FOR DRAWING SHEET GLASS.

Application filed April 12, 1926. Serial No. 101,422.

This invention relates to that method of drawing sheet glass in which the sheet is drawn upwardly out of a molten bath by means of a bait which is drawn slowly upwardly by suitable mechanism, the thickness of the sheet being determined by the speed of the rise of the bait and other features; and one object of the invention is to so control the temperature at the point of formation of the sheet that the sheet will be prevented from narrowing as it lengthens, as more fully hereinafter set forth. A further object is to provide means whereby the sheet shall be drawn in an enclosed heated chamber and taken down and transferred to the annealing leer without removing it from the chamber, to thereby prevent fracturing of the sheet by sudden cooling, as more fully hereinafter set forth. Further objects are set forth in the following specification.

In the drawing annexed—

Fig. 1 is a vertical sectional view of an apparatus for carrying out my method;

Fig. 2 is a similar view on the line 2—2 of Fig. 3;

Fig. 3 is a vertical transverse section on the line 3—3 of Fig. 2;

Fig. 4 is a plan view of the top-cover of the drawing-chamber;

Fig. 5 is a horizontal sectional view through the water-cooled shield movable with the bait;

Fig. 6 is a horizontal sectional view taken through the water-cooled shield above the crucible;

Fig. 7 is a detail perspective view of one of the angle-posts for guiding the bait;

Figs. 8 and 9 are detail perspective views of the hanger for the takedown-tray;

Fig. 10 is a detail perspective view, partly in section, of the axle of the takedown table;

Fig. 10$^a$ is a detail sectional view taken through the line 10—10 of Fig. 2;

Figs. 11, 12, 13 and 14 are detail views of the fluid-operated cutter;

Figs. 15 and 16 are views of the bait;

Fig. 17 is a perspective view of the bail for placing the sheet on the tray;

Figs. 1$^a$ and 1$^b$ are views of a modified arrangement for varying the thickness of the sheet.

Referring to the drawing annexed by reference-characters, 20 designates the crucible-chamber in which is mounted a crucible or pot 21 for holding the molten glass, this chamber being heated in any suitable manner, preferably by gas-burners 22. This crucible-chamber is covered by a water-cooled shield 23 set on the top of the chamber and entirely covering the same except for the elliptical drawing-hole 24 formed in the center of the shield. The crucible-truck is desirably mounted on wheels for convenience in moving it into and out of the crucible-chamber, and the truck on which the crucible rests is adapted to be raised and lowered by a screw-jack 25 to thereby bring the top of the crucible nearer to or farther from the water-cooled shield 23. The plate is drawn up out of the crucible through the hole 24 by means of a bait 26 of any suitable type, preferably the type shown in my Patent No. 1,567,300, dated December 29, 1925. The crucible is preferably of the type shown in my copending application Serial No. 655,286, filed August 2, 1923.

The heat and flames produced by the burners (which burners are arranged all around the crucible so as to project flames against the side of the crucible at a plurality of points) pass up over the top edge of the crucible, on both sides of the sheet near the point of formation and thence up through the hole 24, into the drawing-chamber above. By properly setting the top edge of the crucible with reference to the water-cooled shield, the temperature may be nicely regulated so as to maintain the proper viscosity of the glass at the point of formation and thus maintain uniformity of thickness as well as destroy all tendency of the sheet to narrow as it lengthens.

The drawing-chamber, in which the bait 26 vertically works, is housed in on all four sides except at one side which is open to the takedown-chamber 27. The bait may be raised and lowered by any suitable mechanism mounted on the top-cover 28 of the drawing-chamber. A water-cooled shield 29 travels up and down with the bait, being guided on four vertical posts 30 in the drawing-chamber. Cooling of the shield 23, at the bottom of the drawing-chamber, by water circulation prevents the intense heat from melting or warping or cracking the shield and thus enables me to mount on this shield the supports and guiding-rods of the bait mechanism. The vertical angle-posts 31, one at each corner of the drawing-chamber, not only assist in supporting the masonry of the drawing-chamber, but also assist in guiding the upper shield 29. As will be explained later, the cutting mechanism is mounted on the shield 23, this being rendered possible by the maintenance of a cooling fluid circulating in this shield. The water-cooled shield 29 protects the top-cover 28 of the drawing-chamber and the mechanism for raising and lowering the bait. Of course, suitable flexible hose connections will be made with this shield 29 to permit same to move up and down without disconnection from the water-supply and the drain.

The takedown-chamber 27 is entirely closed all around except where it communicates with the drawing-chamber at one end and with an annealing leer 32 at the other end, this annealing leer being of any suitable construction, the present construction showing it heated by means of gas-burners 33 which project their flames into heat-storing checker-work 34. The takedown mechanism is such that the sheet of newly-drawn glass, after it is severed at its lower end by the cutting mechanism hereinafter described, may be lifted to a horizontal position and then moved back into the leer 32, where it will be permitted to remain until annealed. In this way, I avoid all exposure of the sheet of glass from the beginning of the drawing thereof until it is thoroughly annealed, thereby avoiding the production of strains in the sheet that would eventually cause it to fracture.

The cutting apparatus consists of a pair of long cutting blades 35 arranged on opposite sides of the sheet and mounted on slidable bars 36 whose ends are guided in ways 37 mounted on the water-cooled shield 23. These knife-carrying bars 36 are adapted to be moved back and forth with reference to the sides of the sheet, in unison, by means of fluid-operated pistons working in cylinders 38, one of these pistons being connected to each of the knife-supports. In this way, the two blades 35 (which are of course arranged in approximate parallelism with the side faces of the glass sheet) may be forced into the sheet in unison from opposite sides thereof, thus severing the sheet at a point close to the top surface of the shield without twisting the same. The mounting of this cutting mechanism on the shield 23, in view of the intense heat this shield is subjected to during the drawing process, is rendered possible only by maintaining a fluid-cooling medium in the body of the shield. After the drawn sheet is severed by these knives, the takedown-tray 39 is brought into position alongside the face of the sheet, with its supporting-ribs 40 underneath the lower edge thereof; then the upper edge of the sheet is released from the bait, to thereby permit the severed sheet to seat itself on the takedown-tray. The takedown-tray is then moved back into the leer, as stated.

Any suitable takedown mechanism may be employed, as is obvious. I prefer the mechanism I will now describe: The takedown-tray 39 is mounted on wheels 41 which run on tracks 42 extending from a point within the takedown-chamber 27 into the leer. A short section 42' of the rails 42 is mounted on a table 43 which in turn is supported on the axle 44 of a single-axle truck, the two wheels of which run on tracks 45 mounted in the lower part of the takedown-chamber. This truck 43, together with its axle 44 as well as the short track section 42' are movable toward and from the drawing-chamber by means of a fluid-operated piston working in a cylinder 46 supported in the takedown-chamber, the piston-rod 47 being rigidly connected to a block 48 affixed to the truck 43 and pivotally connected to the axle by means of a bearing-block 49 clamped to the under side of said block 48 by means of suitable bolts. These blocks 48—49 fit in a groove 50 formed in the axle 44, this connection being pivotal so that the axle may rotate in said blocks 48—49. Suitable inlet and outlet pipes 51' are connected to the cylinder 48 to enable the piston in the cylinder to be moved back and forth by means of air or steam.

In normal position, in the takedown-chamber, the tray and truck are in horizontal position, with the short track sections 42' in line with the main track sections 42, being held in alinement by any suitable means such, for instance, as a bracket 51. When the piston in cylinder 46 is projected toward the drawing-chamber, the truck, carrying the tray, moves toward the drawing-chamber on the tracks 45. On the way, the rear end of the truck is tilted upwardly and forwardly so that, when it reaches the drawing-chamber, it is brought to virtually an upright position, preferably slightly inclined away from the vertical line of the sheet which has just been drawn. The truck tilts on the axle 44, and then when the truck is brought back to normal position, with short tracks 42' in alinement with the main tracks 42, the truck tilts backwardly to a horizontal position automatically. This tilting movement of the truck is automatically caused by a pair of grooved cam-rails 52 mounted in the takedown-chamber, and a pair of rollers 53 journaled on pins affixed to the truck-frame and working in the grooves in said cam-rails. To properly position the rollers 53 with reference to the cam-rails, I provide a pair of rigid frame-bars 54.

To prevent the tray 39 running or tilting off the track sections 42' when the truck is tilted downwardly and forwardly, I provide the hanger arrangement shown in detail in Figs. 8 and 9, which consists of a headed pin 55 mounted on the truck and a slotted bracket 56 mounted on one of the axles of the tray, these parts being so arranged that, while the tray is on the truck or table, the fork 56 will engage under the head of the pin 55 and thus interlock the tray with the truck, preventing it either running off the same forwardly or tilting forwardly off the same, without interfering with the withdrawal of the tray from the leer. Any suitable means may be provided for moving the tray back and forth; I have shown an endless chain 59 for this purpose. To insure the tray stopping in exactly the right position to receive the severed, hardened plate, I provide a pair of stops 57 and 58; these stops are desirably so positioned that they will bring the tray to rest, in receiving position, at a slightly oblique angle, inclining upwardly and away from the lower end of the sheet, to thereby insure the sheet coming to rest on the tray in such position that it will not topple toward the left.

The endless chain 59 may be arranged in any suitable manner and may be adapted for connection to the tray-truck in any suitable manner. I may provide the tray-truck with a pair of upstanding pins 60 which are adapted to be swung downwardly and outwardly into engagement with a pair of lugs 61 carried by the chain. These upstanding hinged pins 60 may be pushed down by a rod passed into a hole in the furnace wall or may be automatically tripped into locking position and out of locking position.

To insure the plate of glass coming to rest properly on the tray, I may provide a bail 62 whose cross-bar is enclosed in an asbestos tube 63 and whose journal-pins 64 are journalled in the adjacent wall of the drawing-chamber, this wall being recessed to receive the bail when not in use. When the bail is to be swung out into the drawing-chamber to press the plate against the upright wall of the tray, the bail is manipulated by a crank-handle 65.

As stated, the bait 26 is constructed substantially the same as the bait illustrated in my Patent 1,567,300. In the present construction, however, instead of locking the two swinging halves of the bait by means of clamps, I lock them by means of a latch-lever 66 journalled on the hinge rod 67 and provided with a latch 68 adapted to be swung down into a notch formed in the adjacent wall of one of the bait sections, to thereby prevent the sections from opening to release position until said latch is withdrawn from said notch. The latch-lever 66 is operated by a vertical rod 69 which moves up and down with the bait. This rod is provided with an adjustable collar 70 which may be engaged by a forked lever 71 operated from the base of the machine by a pedal 72 connected to said forked lever by a rod 73. When the bait has reached a predetermined point in its upward travel and it is therefore desired to open the bait-halves in order to release the sheet, the collar 70 will be positioned immediately above the forked end of the lever 71 so that, by pulling down on the rod 73, the forked end of the lever will be swung up under the collar 70 and thus raise the rod 69. The parts normally tend to gravitate into latching position, but to insure the latch 68 a downward unlocking thrust into its notch in the bait, I pivot the latch-lever 66 on an eccentric 73′ mounted on the hinged rod 67.

In Fig. 1, I have shown a separate crucible for containing the glass. When this separate crucible is used, the glass is brought to melted condition in a separate furnace, and the crucible containing the glass is rolled into drawing position in the crucible-chamber. Instead of this method, I may arrange a stationary crucible 21′ in the drawing-chamber and provide an adjacent melting-furnace for continuously supplying the crucible with glass, thus avoiding the necessity of shifting the crucible to and from a melting-furnace. I illustrate this method in Fig. 1ª and Fig. 1ᵇ, the former being a vertical sectional view of the crucible and the latter being vertical sectional views of a series of fire-clay thimbles 74. These thimbles are of different lengths so as to obtain substantially the same adjustability as is obtained by the jack 25. Any one of these thimbles may be dropped into the elliptical drawing-hole in the water-cooled shield 23, to thus vary the annular space between the top of the crucible and the shield 23. The thicker the glass to be drawn, the shorter will be the thimble used. Each thimble is provided with a collar at its outer end which drops down into a rabbet in the upper surface of the water-cooled shield 23, so that the thimbles may be readily removed from the shield by lifting them upwardly.

What I claim as new is:

1. In an apparatus for drawing sheet glass, a crucible-chamber and means for heating the same, a drawing-chamber arranged above said crucible-chamber, means in said chamber for drawing the sheet, a shield arranged above said crucible-chamber and provided with a sheet-drawing opening, the crucible being set at a point below said shield and coincident with said opening whereby the heat generated in the crucible-chamber will flow up around the sheet at the place of formation and into the drawing-chamber.

2. In an apparatus for drawing sheet glass, a crucible-chamber and means for heating the same, a drawing-chamber arranged above said crucible-chamber, means in said chamber for drawing the sheet, a shield arranged above said crucible-chamber and provided with a sheet-drawing opening, the crucible being set at a point below said shield and coincident with said opening whereby the heat generated in the crucible-chamber will flow up around the sheet at the place of formation and into the drawing-chamber, means being provided whereby the crucible may be raised and lowered with reference to the shield to thereby regulate the temperature at the place of drawing.

3. In an apparatus for drawing sheet glass, a crucible-chamber and means for heating the same, a drawing-chamber arranged above said crucible-chamber, means in said chamber for drawing the sheet, a shield arranged above said crucible-chamber and provided with a sheet-drawing opening, the crucible being set at a point below said shield and coincident with said opening whereby the heat generated in the crucible-chamber will flow up around the sheet at the place of formation and into the drawing-chamber, means being provided whereby said shield is water-cooled during the process of drawing.

4. In an apparatus for drawing sheet glass, a crucible-chamber and means for heating the same, a drawing-chamber arranged above said crucible-chamber, means in said chamber for drawing the sheet, a shield arranged above said crucible-chamber and provided with a sheet-drawing opening, the crucible being set at a point below said shield and coincident with said opening whereby the heat generated in the crucible-chamber will flow up around the sheet at the place of formation and into the drawing chamber, means being provided whereby said shield is water-cooled during the process of drawing, the drawing and cutting mechanism being mounted on said water-cooled shield.

5. In an apparatus for drawing sheet glass, a crucible-chamber covered by a water-cooled shield which is provided with a drawing-opening, means for heating said chamber, a crucible mounted in the crucible-chamber with its top edge below the shield to permit the flames and heat to pass up over the edge of the crucible up through said opening, a closed drawing-chamber mounted above said opening, and a drawing mechanism mounted in said drawing-chamber embodying a vertically-movable water-cooled shield arranged above the bed of the drawing mechanism.

6. A takedown apparatus embodying a tray for receiving the drawn sheet of glass, a support for said tray and means for moving this support toward and from the drawing-chamber, and means whereby the support and the tray are automatically tilted to a vertical position in the drawing-chamber to receive the upright sheet of glass and whereby the tray and support are tilted back to horizontal position when moved away from the drawing-chamber.

7. A takedown apparatus embodying a tray, a support having tracks on which the tray runs, a leer into which a separate extension of said tracks runs, whereby the tray may be rolled off the support and into the leer, means for moving said tray-supporting tracks into the drawing-chamber and back again into alinement with the tracks in the leer, means whereby when the support is moved into the drawing-chamber the tracks and the tray will be tilted to a vertical position approximately in the plane of the drawn sheet of glass and whereby when the parts are moved away from the drawing-chamber the tracks and tray will resume normal position so that the tray may be rolled off its supporting tracks and onto the tracks leading into the leer.

8. A takedown apparatus embodying a wheeled truck having tracks, a wheeled tray mounted on said tracks, means for moving said truck and said tracks toward and from the drawing-chamber, and means whereby the truck and tray are tilted downwardly to a vertical position when moved toward the drawing-chamber and brought back to a horizontal position when moved away from the drawing-chamber.

9. In glass-drawing, a bait constructed of two depending hinged sections adapted to open to release the drawn sheet, one of the sections being provided with a notch in its outer face, a pivoted latch-lever provided with a latch adapted to enter said notch to lock the bait-sections together, and means for manipulating said latch-lever.

10. A takedown apparatus embodying a tray for receiving the drawn sheet of glass, a support for said tray and means for moving this support toward and from the drawing-chamber, and means whereby the support and the tray are automatically tilted to a vertical position in the drawing-chamber to receive the upright sheet of glass and whereby the tray and support are tilted back to horizontal position when moved away from the drawing-chamber, the tray being movable off the support and there being provided means for suspending the tray on the support when in vertical position.

11. In a sheet-glass making apparatus, a crucible and a bait for drawing a sheet therefrom, means for moving the bait up and down, said bait being adapted to release the sheet without severing or breaking the same, a cutting means to sever the sheet from the molten glass so that it will be suspended from the bait, a tray for receiving the sheet when released from the bait, means for moving this tray into upright receivable position and away from said position, and means at the other side of the sheet of glass for pushing the drawn sheet to disconnect it from the bait and thus permit it to settle to rest position in said tray.

12. A takedown apparatus embodying a tray for receiving the drawn sheet of glass, a support for said tray and means for moving this support toward and from the drawing-chamber, means whereby the support and the tray are automatically tilted to a vertical position in the drawing-chamber to receive the upright sheet of glass and whereby the tray and support are tilted back to horizontal position when moved away from the drawing-chamber, and means for arresting said support in exact position for receiving the glass sheet on the tray.

In testimony whereof I hereunto affix my signature.

GEO. G. ROBERTS.